United States Patent [19]

Seidel

[11] Patent Number: 5,257,907
[45] Date of Patent: Nov. 2, 1993

[54] AXIALLY COMPACT RAM AIR TURBINE

[75] Inventor: William E. Seidel, Rockford, Ill.

[73] Assignee: Sundstrand Corporation, Rockford, Ill.

[21] Appl. No.: 839,311

[22] Filed: Feb. 20, 1992

[51] Int. Cl.⁵ .................................. B64C 11/28
[52] U.S. Cl. .......................... 416/137; 416/135; 416/136; 416/140
[58] Field of Search ............... 416/131, 135, 136, 137, 416/139, 140, 142, 144

[56] References Cited

U.S. PATENT DOCUMENTS

| | | | |
|---|---|---|---|
| 1,833,843 | 11/1931 | Leparmentier | 416/137 |
| 1,834,351 | 12/1931 | Schroeder | 416/136 |
| 2,504,737 | 4/1950 | Sharpes | 416/135 |
| 2,693,242 | 11/1954 | Elmer | 416/140 |
| 2,815,188 | 12/1957 | Nelson | 416/137 |
| 2,997,109 | 8/1961 | Blackburn | 416/137 |
| 4,411,596 | 3/1980 | Chilman . | |
| 4,743,163 | 5/1988 | Markunas et al. | 416/137 |

FOREIGN PATENT DOCUMENTS 1198700  8/1965  Fed. Rep. of Germany ...... 416/137

Primary Examiner—Edward K. Look
Assistant Examiner—Mark Sgantzos
Attorney, Agent, or Firm—Wood, Phillips, VanSanten, Hoffman & Ertel

[57] ABSTRACT

An undesirably long axial length of a ram air turbine may be reduced in a construction including a hub (110) mounted for rotation about a rotational axis (112), at least one turbine blade (114) rotatably mounted on the hub (110) for rotation between coarse and fine pitch positions about a blade pitch axis (116) which is different from the rotational axis (112) and a counterweight assembly (120) for each turbine blade (114) and mounted on the hub (110) for rotation between coarse and fine pitch positions about the blade pitch axis (116) in spaced relation to the rotational axis (114) and disposed when rotated about the rotational axis (112) to bias the turbine blade (114) towards its coarse pitch position. A limited lost motion connection (143, 144, 145, 146, 147, 148, 150) is located between the turbine blade (114) and the counterweight assembly (120). The main governor spring (130) biases the counterweight (120) toward a fine pitch position and a spring (142) acts across the lost motion connection (143, 144, 145, 146, 147, 148, 150) and biases the blade (114) toward the coarse pitch position.

11 Claims, 2 Drawing Sheets

AXIALLY COMPACT RAM AIR TURBINE

FIELD OF THE INVENTION

This invention relates to ram air turbines for incorporation on aircraft in a normally stowed condition.

BACKGROUND OF THE INVENTION

For many years, aircraft have included as standard equipment, backup power supplied for use in times of power outage in the form of air driven turbines or fans. These turbines or fans are lowered into the airstream, thereby making use of the relative speed of the aircraft through the ambient air to cause the turbine or fan blades to rotate. The rotation imparted to the blades is then used to drive electrical generating gear or provide hydraulic power to the aircraft hydraulic system, or both during a power outage.

Conventionally, these devices are known as ram air turbines and include governor mechanisms that provide a measure of control over the output rotational speed delivered from the blade to the electrical or hydraulic units corresponding to the most efficient operating speed of such units.

One example of such a unit is illustrated in U.S. Pat. No. 4,411,596 issued Oct. 25, 1983 to Chilman, entitled "Ram Air Turbine Control System" and assigned to the same Assignee of the instant application. The Chilman device is successful for its intended purpose. However, because it employs fly weights which are used during startup of the device in addition to counterweights for the turbine blades, the same is larger than desired. Needless to say, in aircraft usages, bulk and weight are always of concern as is cost. Clearly, it would be desirable to reduce each.

A primary reason for the configuration of the Chilman device is that it provides a mechanism that may be stored out of the airstream with its blades in a coarse pitch position. When the blades are in coarse pitch position, the achievable speed is minimal. Consequently, if the blades are stuck-in one pitch position, due to ice or corrosion, when the ram air turbine is deployed after the blades have been stored in the coarse pitch position, the unit will not overspeed and self-destruct as might occur if the blades were stuck in a fine pitch position.

In normal starting, when the ram air turbine blades increase in rotational speed, the blades are conventionally transitioned from coarse pitch to fine pitch by the fly weights which move an entire spring carriage assembly. After that is accomplished, the turbine accelerates to a speed in the normal governing range and the primary governor, a counterweight associated with the blades and a governor spring take over and regulate speed from that point on.

Another reason for storing the ram air turbine with its blades in a coarse pitch position is due to the fact of air resistance to deployment. If the blades are in a coarse pitch position, the ram air turbine is aerodynamically "cleaner" during the deployment process that would be the case if the blades were in a fine pitch position. As a consequence, a smaller, and thus lighter and lower cost actuator for moving the turbine to a deployed position may be utilized.

The present invention seeks to provide a ram air turbine possessing all of the advantages of those heretofore known which are stored in the coarse pitch position and yet which is of less bulk by reason of a lesser axial length, of lesser weight because of the reduced bulk, and of lowered cost because of reduced complexity.

SUMMARY OF THE INVENTION

An exemplary embodiment achieves the foregoing in a ram air turbine that includes a rotatable hub with at least one turbine blade mounted thereon for rotation therewith and movable on the hub between coarse and fine pitch positions. A counterweight is connected to the blade and is operable, when rotated, to bias the blade toward one of the pitch positions. A governor spring is coupled to the blade as well. The invention contemplates the improvement wherein the counterweight and the blade are connected by a limited lost motion connection and means are provided for biasing the blade about the connection toward the other of the pitch positions. As a consequence of this structure, fly weights used during startup are eliminated entirely, thereby enabling a reduction in the axial length of the ram air turbine, reducing the weight thereof and cutting costs by eliminating complexity and parts.

In a highly preferred embodiment, the ram air turbine of the invention includes a hub mounted for rotation about a rotational axis and at least one turbine blade rotatably mounted on the hub for rotation between coarse and fine pitch positions about a blade pitch axis. The blade pitch axis is different from the rotational axis. A counterweight assembly is provided for each turbine blade and is mounted on the hub for rotation between coarse and fine pitch positions about the blade pitch axis in spaced relation to the rotational axis. The counterweights are thus disposed so that when rotated about the rotational axis, they bias the turbine blades towards the coarse pitch position. A lost motion connection is established between the turbine blade and the counterweight assembly. A main governor spring is provided to bias one of the counterweight and the blade toward the fine pitch position. Means are provided that act across the lost motion connection and bias the blade toward the coarse pitch position.

As a consequence of this construction, during startup, by reason of the bias across the lost motion connection, the counterweights may start in the fine pitch position while the blade effectively starts in a coarse pitch position. As speed increases, centrifugal power on the blade will overpower the bias acting across the lost motion connection allowing the blades to transition towards fine pitch. Once reaching fine pitch, the lost motion of the lost motion connection bottoms out and the counterweight and the blade become effectively a rigid structure, allowing governing in the conventional fashion. Upon shutdown, as speed diminishes, the bias acting across the lost motion connection will eventually return the blade toward the coarse pitch position.

In a preferred embodiment, the means acting across the lost motion connection include a biasing spring. Preferably, the biasing spring is a torsion spring. In a highly preferred embodiment, the torsion spring includes a wrap and the wrap is about the blade pitch axis.

In one embodiment of the invention, the lost motion connection includes a collar fixed to and rotatable with the turbine blade about the blade pitch axis and a pair of interengaging stop surfaces on each of the collar and the counterweight. The stop surfaces of the pair on one of the collar and the counterweight are spaced a greater distance than the stop surfaces of the pair on the other of the collar and the counterweight.

Optimally, the counterweight includes an opening centered on the blade pitch axis with the stop surfaces of the associated pair being circumferentially spaced about the opening The collar is disposed in the opening and the stop surfaces of the associated pair are spaced about the periphery of the collar.

Other objects and advantages will become apparent from the following specification taken in connection with the accompanying drawings.

DESCRIPTION OF THE PREFERRED EMBODIMENT

Figure 1:
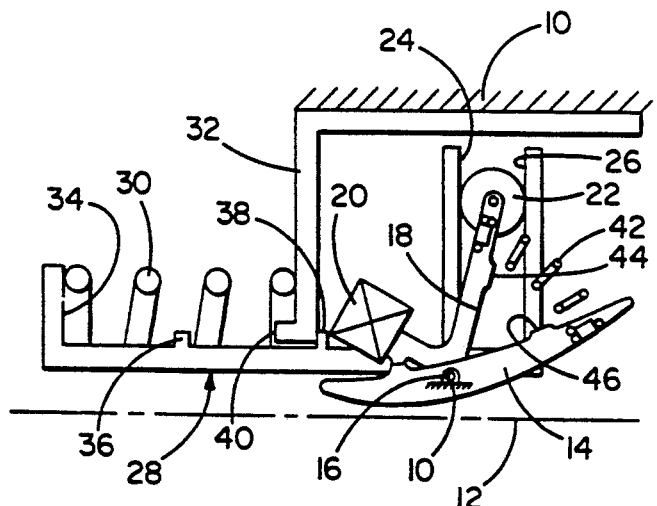
FIG. 1 is a mechanical schematic of a ram air turbine embodying the invention in the stowed position.
Figure 2:
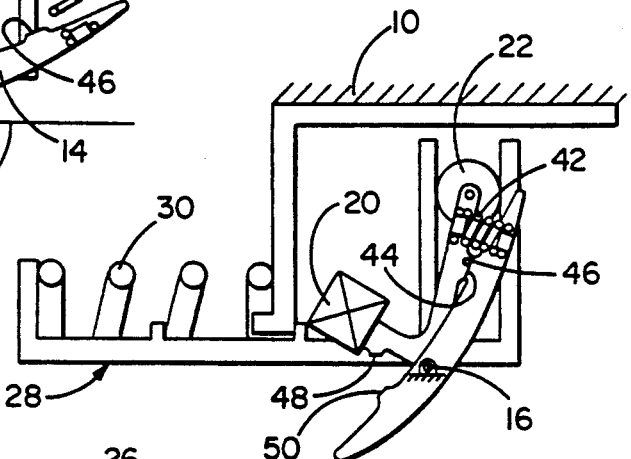
FIG. 2 is a view similar to FIG. 1 but illustrating the ram air turbine in a startup/low speed governing, fine pitch condition.
Figure 3:
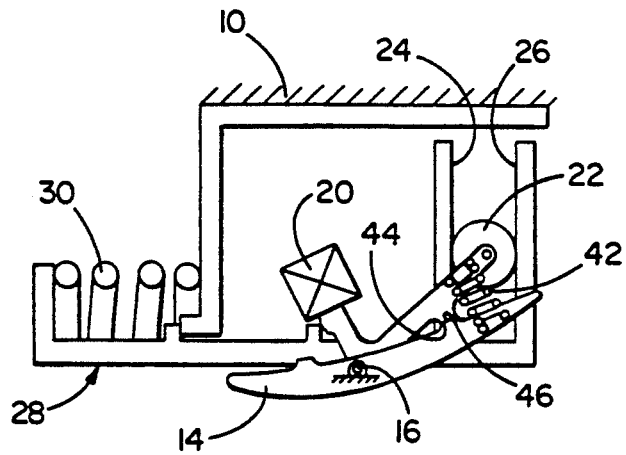
FIG. 3 is a view similar to FIGS. 1 and 2, but illustrating the components in a high speed governing or coarse pitch condition.

A schematic illustration of a ram air turbine embodying the invention is illustrated in FIGS. 1-3 and with reference thereto, is seen to include a hub shown schematically at 10 which, of course, will be rotatable about an axis 12. As illustrated in FIG. 1, only that part of the mechanism to one side of the axis 12 is illustrated, it being understood that the same will typically be symmetrical about the axis 12 which also has the centerline of the device.

Oppositely directed turbine blades 14 are mounted on the hub 10 by a pivot 16 for rotation about a blades pitch axis defined by the pivot 16. The blades may rotate between a coarse pitch position illustrated in FIG. 1 and a fine pitch position illustrated in FIG. 2. It will be noted that in the usual case, the axis defined by the pivot 16 will be in a plane that is transverse to the axis 12.

Also pivoted about the pivot axis 16 is a bellcrank 18 having a conventional counterweight 20 on one end and a roller or follower 22 on the other end. The roller 22 is located between opposed surfaces 24 and 26 which form part of a carriage assembly, generally designated 28, of a sort generally well-known. A compression coil spring 30 which serves as a main governing spring is located between a bulkhead 32 on the hub 10 and a radially directed flange 34 on the carriage assembly 28. As seen in FIG. 1, the spring 30 biases the carriage assembly 28 toward the left and thus causes the bellcrank 18 to move in a counterclockwise direction about the pivot 16, to normally dispose the counterweight 20 in a position that corresponds to fine pitch operation.

The carriage assembly 28 includes stops 36 and 38 engagable with a stop 40 on the lower end of the bulkhead 32. The stop 36 is a coarse pitch stop which prevents components from moving past their coarse pitch position while the stop 38 is a fine pitch stop which prevents the components from moving past their fine pitch positions.

A biasing means in the form of a spring 42 is interposed between the blade 14 and the bellcrank 18. The spring 42, in the schematic illustration, is a compression spring, of considerably lesser spring rate than the spring 30. Thus, given that when no forces are acting upon the blade 14 as when the ram air turbine is in a stowed condition and the main governing spring 30 biases the components such that the counterweight 20 occupies a fine pitch position, the bias provided by the spring 42 will bias the blade 14 to a coarse pitch position about the pivot 16 which, of course, is a desirable position for stowage as mentioned previously.

Stops 44 and 46 may engage one another to limit relative pivotal movement between the bellcrank 18 and the blade 14 in one direction of rotation while stops 48 and 50 similarly limit relative rotation between the components in the opposite direction.

As mentioned, FIG. 1 illustrates the stowed configuration of the components with the counterweight 20 being in a fine pitch position and the blade 14 in a coarse pitch position. When the ram air turbine is deployed, aerodynamic forces acting against the blade 14 will begin to rotate the blade 14, thereby rotating the hub 10.

The location of the pivot axis defined by the pivot 16 in relation to the axis 12 as well as in relation to the blade 14 itself is such that as the blade 14 begins to rotate about the axis 12, centrifugal force acting upon the blade 14 will tend to cause the same to move toward the fine pitch position. Thus, this centrifugal force will increase as rotational speed increases and ultimately overcomes the biasing force provided by the spring 42. Consequently, the blade 14 will move towards the fine pitch position and the stops 44 and 46 will engage. Because of the centrifugal force acting upon the blade, once the stops 44 and 46 engage, the counterweight 20 and blade 14 will behave as though they were rigidly connected as in the Chilman device and speed regulation under the influence of the governing spring 30 will occur just as in Chilman. It will be observed, however, that the desired transition from startup to normal operation is obtained without the use of flyweights, allowing their omission entirely. With the blades 14 in a fine pitch condition, the system will accelerate rapidly to the normal governing range and the increased rotative speed will cause the counterweights 20 to move from the fine pitch position illustrated in FIG. 2 toward the coarse pitch position illustrated in FIG. 3, compressing the governor spring 30 to provide the governing action.

Upon shutdown of the system, ultimately, the spring 30 will return the counterweight 20 toward the fine pitch position thereof, but with speed in the system decaying, the centrifugal force on the blades 14 acting against the spring force provided by the spring 42 will likewise decay with the consequence that the blade 14 will be returned to the coarse pitch position.

Figure 5:
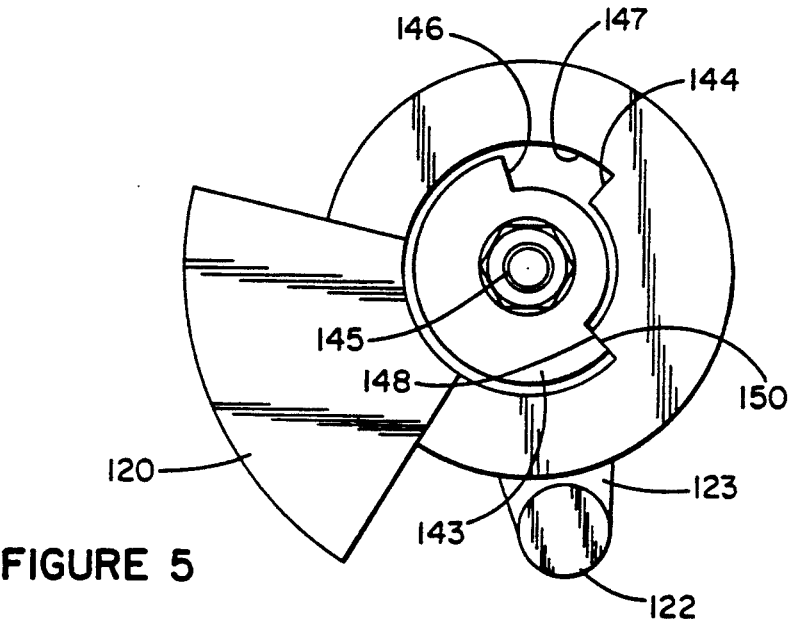
FIG. 5 is a sectional view taken approximately along the lines 5—5 in FIG. 4.
Figure 4:
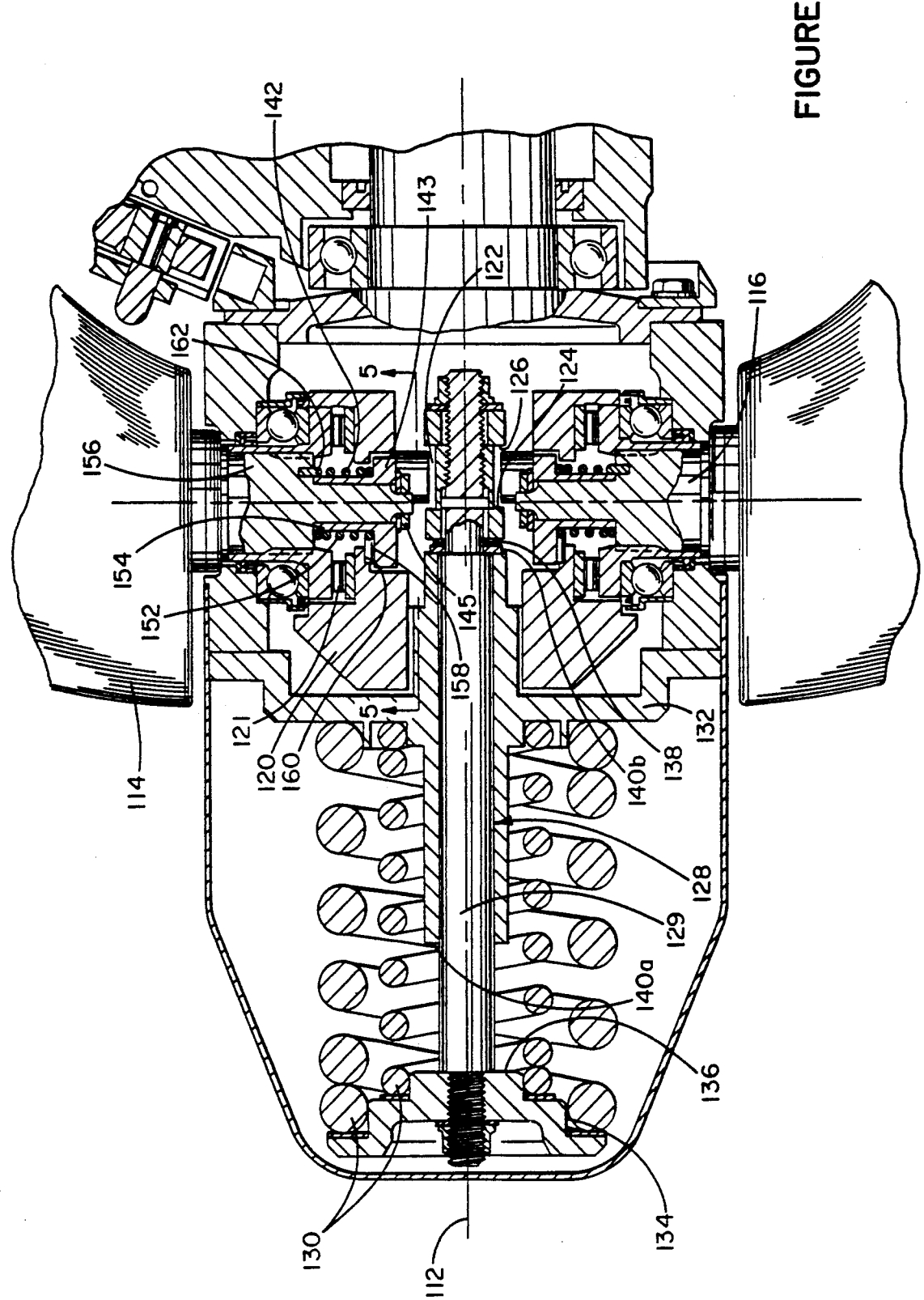
FIG. 4 is a sectional view illustrating a preferred mechanical implementation of the device shown schematically in FIGS. 1-3.

FIGS. 4 and 5 illustrate actual mechanical implementation of a preferred embodiment. A rotatable hub is shown at 110 and is mounted by any suitable means for rotation about an axis 112. Diametrically opposite ram turbine blades 114 are mounted for rotational movement about a pivot axis 116 which is related to the axis 112 in the same manner as the pivot 16 is related to the axis 12.

A counterweight assembly 120 is journalled for rotation about the axis 116 by bearings 121. As perhaps best seen in FIG. 5, the counterweight assembly 120 includes a roller or follower 122 on an arm 123 displaced from the main body of the counterweight assembly 120. The roller 122 is disposed between opposed surfaces 124 and 126 on a carrier assembly, generally designated 128, which includes an elongated shaft 129 axially movable along the axis 112.

A pair of main governor springs 130 are disposed between a bulkhead 132 forming part of the hub 110 and a retaining cap 134 secured to the end of the shaft 126 remote from the surfaces 124 and 126 by any suitable means. Thus, the main governor springs 130 bias the shaft 129 to the left as illustrated in FIG. 4.

The bulkhead 132 includes opposed stop surfaces 140a and 140b. If the shaft 129 moves to the right as viewed in FIG. 4, ultimately a surface 136 on the axis 112 will engage the surface 140a such that the former acts as a coarse pitch stop in connection with the surface 140a. A washer assembly 138 carried by the shaft 129 closely adjacent the surface 124 acts as a fine pitch stop in connection with the surface 140b.

A spring 142 in the form of a torsion spring acts between the counterweight assembly 120 and the blade 114 in the same fashion as the spring 42 (FIGS. 1-3). As viewed in FIGS. 4 and 5, a collar 143 is secured as by a nut 145 to the blade 114. The collar 143 is disposed in an opening 147 within the flyweight assembly 120. Circumferentially spaced about the opening 147 and on the flyweight assembly 120 are a pair of radial surfaces 144 and 148 which serves the same function as the stop surfaces 44 and 48 on the bellcrank 18. The collar 143, at peripherally spaced locations, carries corresponding stop surfaces 146 and 150 which may react with the surfaces 144 and 148, respectively. This arrangement defines a limited lost motion connection, the limits of which are defined by the desired travel of the blade between coarse and fine pitch position while the counterweight assembly 120 is held in one position or the other. Thus, the spacing between the stops 144 and 148 on the flyweight assembly 120 will necessarily be different than the spacing between the stops 146 and 150 on the collar 143 so as to allow the lost motion.

In a preferred embodiment, the spring 142 includes a coil or wrap 152 about a sleeve-like end 154 of the collar 143 which in turn is disposed about a stub shaft 156 connected to the blade 114. One end 158 of the spring is received in a recess or small bore 160 in the flyweight assembly 120 while the opposite end 162 of the spring 142 is suitably coupled, generally in the same fashion, to the blade 114 or components associated therewith. Thus, an extremely compact arrangement results.

In general, the governing springs 130 are sized so that the counterweight assembly 120 will not move towards its coarse position until the rotative speed of the system is in the normal governing range, typically 5,000-7,000 rpm. At the same time, the torsion spring 142 is sized so as to allow transition of the blade 14 from its coarse pitch position towards its fine pitch position at around 1,500 rpm.

From the foregoing, it will be seen that a ram air turbine made according to the invention may be desirably stowed in the coarse position to achieve the advantages of such stowage. At the same time, it can be readily appreciated that the ram air turbine of this invention eliminates any need for flyweights as in the prior art and additionally eliminates the aft spring seat employed as well. Other simplifications will likewise be apparent. These eliminations allow the axial length of the ram air turbine to be reduced. They also reduce the material required in making the ram air turbine, thereby providing a weight reduction as well as a cost saving for material. Furthermore, the elimination of the elements reduces the complexity of the ram air turbine, thereby providing a further cost reduction.

I claim:

1. A ram air turbine comprising:
   a hub mounted for rotation about a rotational axis; at least one turbine blade rotatably mounted on said hub for rotation about a blade pitch axis between coarse and fine pitch positions, said blade pitch axis being different from said rotational axis;
   a counterweight assembly for each said turbine blade and mounted on said hub for rotation between coarse and fine pitch positions about said blade pitch axis in spaced relation to said rotational axis and disposed when rotated about said rotational axis to bias said turbine blade toward said coarse pitch position;
   a lost motion connection between said turbine blade and said counterweight assembly;
   a main governor spring biasing one of said counterweight and said blade toward said fine pitch position; and
   means acting across said lost motion connection and biasing said blade toward said coarse pitch position.

2. The ram air turbine of claim 1 wherein said means acting across include a biasing spring.

3. The ram air turbine of claim 1 wherein said biasing spring is a torsion spring.

4. The ram air turbine of claim 3 wherein torsion spring includes a wrap and said wrap is about said blade pitch axis.

5. The ram air turbine of claim 4 wherein said lost motion connection comprises a collar fixed to and rotatable with said turbine blade about said blade pitch axis, and a pair of interengaging stop surfaces on each of said collar and said counterweight, the stop surfaces of the pair on one of said collar and said counterweight being spaced a greater distance than the stop surfaces of the pair on the other of said collar and said counterweight.

6. The ram air turbine of claim 5 wherein said counterweight includes an opening centered on said blade pitch axis with the stop surfaces of the associated pair being circumferentially spaced about said opening, and said collar is disposed in said opening and the stop surfaces of the associated pair are spaced about the periphery of said collar.

7. The ram air turbine of claim 1 wherein said lost motion connection comprises a collar fixed to and rotatable with said turbine blade about said blade pitch axis, and a pair of interengaging stop surfaces on each of said collar and said counterweight, the stop surfaces of the pair on one of said collar and said counterweight being spaced a greater distance than the stop surfaces of the pair on the other of said collar and said counterweight.

8. The ram air turbine of claim 7 wherein said counterweight includes an opening centered on said blade pitch axis with the stop surfaces of the associated pair being circumferentially spaced about said opening, and said collar is disposed in said opening and the stop surfaces of the associated pair are spaced about the periphery of said collar.

9. In a ram air turbine including a rotatable hub with at least one turbine blade mounted thereon for rotation therewith and movable on the hub between coarse and fine pitch positions, a counterweight connected to the blade and operable when rotated to bias the blade toward one of said positions, and a governor spring coupled to said counterweight, the improvement wherein said counterweight and said blade are connected by a limited lost motion connection and means for biasing said blade about said connection toward the other of said positions.

10. The ram air turbine of claim 9 wherein said one position is said coarse pitch position and said other position is said fine pitch position.

11. A ram air turbine comprising:
  a hub mounted for rotation about a rotational axis;
  at least one turbine blade rotatably mounted on said hub for rotation about a blade pitch axis between coarse and fine pitch positions, said blade pitch axis being different from said rotational axis;
  a counterweight assembly for each said turbine blade and mounted on said hub for rotation between coarse and fine pitch positions about said blade pitch axis in spaced relation to said rotational axis and disposed when rotated about said rotational axis to bias said turbine blade toward said coarse pitch position;
  a limited lost motion connection between said turbine blade and said counterweight assembly;
  a main governor spring on said hub and coupled to said counterweight for biasing said counterweight toward said fine position thereof; and
  a torsion spring wrapped about said blade pitch axis and having one end coupled to said counterweight and an opposite end coupled to said turbine blade and operative to bias said turbine blade toward one limit of movement of said lost motion connection relative to said counterweight, said one limit of movement corresponding to the coarse pitch position of said turbine blade.

* * * * *